United States Patent [19]

Atkinson

[11] Patent Number: 5,883,884
[45] Date of Patent: Mar. 16, 1999

[54] WIRELESS DIGITAL COMMUNICATION SYSTEM HAVING HIERARCHICAL WIRELESS REPEATERS WITH AUTONOMOUS HAND-OFF

[75] Inventor: Roger F. Atkinson, 1179 Carnelian St., El Cajon, Calif. 92021

[73] Assignees: Roger F. Atkinson; Alwin C. Michaelson, both of Santee, Calif.

[21] Appl. No.: 636,218

[22] Filed: Apr. 22, 1996

[51] Int. Cl.⁶ .................................................. H04B 7/212
[52] U.S. Cl. .......................... 370/279; 370/280; 370/315; 370/329; 455/15; 455/20
[58] Field of Search .................................... 370/328, 329, 370/330, 331, 321, 332, 337, 347, 315, 319, 480, 481, 277, 279, 280, 293; 455/33.2, 33.4, 15, 16, 17, 20

[56] References Cited

U.S. PATENT DOCUMENTS

| | | |
|---|---|---|
| 4,112,257 | 9/1978 | Frost . |
| 4,284,848 | 8/1981 | Frost . |
| 4,718,108 | 1/1988 | Davidson et al. . |
| 4,727,590 | 2/1988 | Kawano et al. . |
| 4,881,271 | 11/1989 | Yamauchi et al. . |
| 4,941,200 | 7/1990 | Leslie et al. ............................... 455/17 |
| 5,065,449 | 11/1991 | Gordon et al. ............................ 455/15 |
| 5,133,001 | 7/1992 | Bohm . |
| 5,152,002 | 9/1992 | Leslie et al. ............................... 455/17 |
| 5,179,720 | 1/1993 | Grube et al. . |
| 5,265,150 | 11/1993 | Helmkamp et al. . |
| 5,566,168 | 10/1996 | Dent . |
| 5,604,744 | 2/1997 | Andersson et al. . |
| 5,640,677 | 6/1997 | Karlsson ................................ 455/33.2 |
| 5,640,678 | 6/1997 | Ishikawa et al. ...................... 455/33.2 |

*Primary Examiner*—Min Jung

[57] ABSTRACT

In a wireless communication system, a base unit transmits outgoing TDM signals within a base transmission coverage area at a first frequency. Repeaters in the base coverage area receive the outgoing signal and retransmit it within respective repeater coverage areas at respective frequencies, maintaining the same time slot orientation in TDM format. Several levels of repeaters form a hierarchy covering an expanded range. Remote subscriber units located in a coverage area receive the strongest outgoing frequency signal from a repeater/base unit in a time slot assigned to that unit for a particular call, which time slot is maintained for that call through successive levels of repeaters. Incoming TDMA signals from remote units use the same time slots used in received outgoing signals. The base unit transmits outgoing signals and receives incoming signals at the same frequency, but at different times. Each repeater receives outgoing signals from a lower level repeater (or from the base unit) at the transmission frequency of that lower level repeater, and immediately retransmits the signal in its own coverage at a different frequency. Incoming signals transmitted to any particular repeater from a remote unit in its coverage area, or from a higher level repeater, are at the outgoing transmission frequency for that repeater. Repeaters and remote units can switch between repeaters to communicate with the base unit depending upon received signal strength, thereby providing minimal interruption during communication.

26 Claims, 7 Drawing Sheets

WIRELESS DIGITAL COMMUNICATION SYSTEM HAVING HIERARCHICAL WIRELESS REPEATERS WITH AUTONOMOUS HAND-OFF

BACKGROUND OF THE INVENTION

1. Technical Field

The present invention pertains to a method and apparatus for attaining improved sound quality and extended range in wireless digital communication systems.

2. Discussion of Prior Art

Helmkamp et al (U.S. Pat. No. 5,265,150) disclose a wireless private branch exchange (PBX) system capable of automatic optimal configuration. Specifically, the wireless system includes a central transceiver, a plurality of fixed stations, and a plurality of portable stations capable of being carried throughout the site or area where the system is installed. Fixed stations are capable of being used as repeaters at which information from the central transceiver is received and retransmitted in a prescribed protocol to thereby extend the effective range of the central transceiver. Communications between the central transceiver and fixed stations are in a time division multiplexing (TDM) format allowing for implementation using only a single transmitter/receiver pair in each of the fixed and portable stations. The central transceiver and fixed stations are capable of selecting an optimal channel and utilize a time division duplexer to coordinate transmission and reception of signals.

The extended range of the central transceiver is divided into range levels wherein repeaters (fixed stations) situated at one level may communicate with only a single repeater of adjacent levels. Further, repeaters store and repeat certain frames destined for additional repeaters and range levels.

Böhm (U.S. Pat. No. 5,133,001) discloses a radio telephone system in the form of a private branch exchange (PBX). Specifically, the radio telephone system includes a control unit for two-way communication to mobile subscriber units via a radio bus. The radio bus includes elements for transmission and reception of information between the central unit and the mobile subscriber units. Communication from the central unit traverses several radio bus elements until an element is reached that is within radio range of the desired mobile subscriber unit. Communication by radio bus elements utilize time division multiple access (TDMA) wherein time slots may originate from different locations allowing many radio bus elements to transmit to a single receiver, while the mobile subscriber units operate as telephone stations and utilize time division multiplexing (TDM) wherein time slots are transmitted in rigid time sequences originating at a single location.

Frost (U.S. Pat. No. 4,284,848) discloses a switched network telephone subscriber distribution system. Specifically, the system includes a central radio station and radio subscriber stations, each containing two frequency agile duplex radio transceivers. The radio subscriber stations are used as repeaters for calls outside the range of the central radio station. When radio subscriber stations are busy with a call, communication between a particular radio subscriber station and the central radio station is routed on an alternative route utilizing other available radio subscriber stations. In the case of multiple central radio stations, communication from a first central radio station may be transferred to a second central radio station when all subscriber radio stations associated with the first central radio station are being utilized.

The prior art suffers from certain disadvantages. For example, central units tend to require high operating power levels to cover extended ranges, thereby increasing the risk of interference in the communications. Moreover, repeaters are capable of communication only with a single repeater of a different range level, thereby limiting the number of possible paths via which a call may be routed. Further, this restricts communication between repeaters of the same range level.

OBJECTS AND SUMMARY OF THE INVENTION

Accordingly, it is an object of the present invention to provide a wireless digital telephone system utilizing relatively low power operation at base stations and repeaters to thereby limit the range, hence the resulting co-channel interference, to reduce the cost of the hardware. Low power operation is achieved by utilizing only a single receiver and transmitter at each base station and repeater. It is another object of the present invention to provide such a system with improved sound quality and minimal noise and interference.

A further object of the present invention is to enable repeaters to communicate in a hierarchical network between remote subscriber units and a base station. Further, the repeaters and remote units may switch and select optimal communication paths through repeaters without mutual interference or interruption of communication.

According to the present invention, improved wireless communication is accomplished by the use of common equipment performing telephone switching functions (private automatic branch exchange, key service unit, central office), a base unit for wireless digital transmission and reception, repeaters for selecting a channel and transmitting and receiving the communication, and remote units (e.g., telephones, computers, etc.) situated at an ultimate destination of the communication for receiving, transmitting, and responding to the communication. Specifically, the repeaters are arranged in a hierarchical network of successively overlapping transmission coverage areas and reception ranges, originating at the base unit, to encompass an overall system coverage area. A first level of repeaters is situated proximate the outer perimeter of the transmission and reception range of the base unit. A second level of repeaters is situated at the outer perimeters of the transmission and reception range of each of repeaters in the first level. The hierarchy escalates in this fashion until the desired area is encompassed. The base unit transmits an outgoing TDM signal at a first carrier frequency to a remote unit located within the system area encompassed by the repeater network. Each first level repeater receives the outgoing signal and retransmits it at a second carrier frequency to second level repeaters and remote units in its transmission coverage area. Incoming signals are received at the first level repeaters from other repeaters or remote units at the second carrier frequency and are retransmitted to the base station at the first carrier frequency. In this manner, each repeater utilizes one carrier frequency to receive outgoing signals from and transmit incoming signals to a lower level repeater or the base station, and utilizes a second carrier frequency to transmit outgoing signals to and receive incoming signals from higher level repeaters and remote units in its transmission coverage area. Outgoing signals, in the form of TDM time slots, alternate with incoming signals, in the form of TDMA slots, thereby permitting the use of a single transmitter and single receiver at each repeater arranged to switch between the two carrier frequencies employed by the repeater.

When repeaters receive and retransmit signals from the base unit, the repeaters and remote units receive the signal and selectively traverse the communication path to the base unit through the repeaters (or directly to the base unit if the repeater or remote unit is within the transmission and reception range of the base unit) yielding the strongest signal. Upon a disruption in communication, the repeater and remote unit may autonomously switch (hand-off) to an alternative path to communicate with the base unit thereby minimizing interruption of communication. Alternatively, multiple base units may be employed, with each base unit having a respective hierarchical repeater system. The base unit and associated hierarchical repeater system are collectively referred to as a "macrocell". Macrocell may overlap in a given area where repeaters of one macrocell may transfer communications (hand-off) to another macrocell having better signal strength to improve reception and avert communication disruption.

Since the remote units utilize the strongest signal, enhanced sound quality is maintained during wireless communication.

The above and still further objects, features and advantages of the present invention will become apparent upon consideration of the following detailed description of the specific embodiment thereof, particularly when taken in conjunction with the accompanying drawings wherein like reference numerals in the various figures are utilized to designate like components.

DESCRIPTION OF THE PREFERRED EMBODIMENTS

Figure 1:
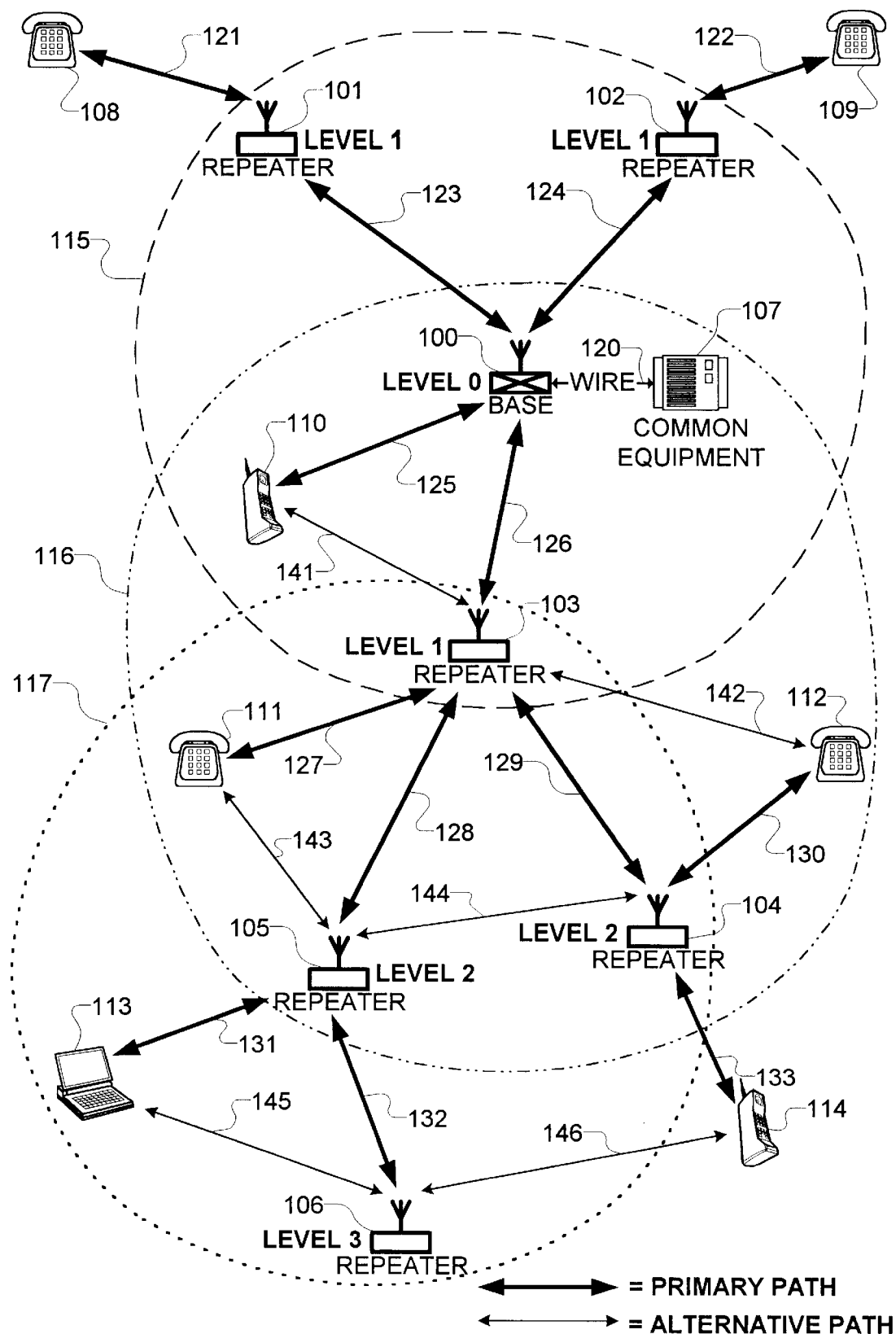
FIG. 1 is a topological view of a hierarchical repeater network according to the present invention.

FIG. 1 illustrates the overall principle of a hierarchical repeater network of the present invention. Specifically, a base station 100 is connected to common equipment 107. Common equipment 107 typically performs switching and control functions of a private automatic branch exchange, key service unit, or a central office in a public telephone network application. Although the preferred embodiment relates to telephone applications, other applications are equally applicable to the principles of the invention, including data or video applications where common equipment 107 performs routing or switching functions necessary to deliver information to a user. Common equipment 107 further provides an interface to outside lines and other resources and performs switching and billing functions utilizing industry standard techniques.

Base station 100 typically includes a digital transmitter, receiver and antenna for transmitting signals from common equipment 107 in a time division multiplexing format (TDM) and receiving signals in a time division multiple access format (TDMA) while alternating between transmission and reception modes using time division duplex (TDD) as described below. Base station 100 is connected to common equipment 107 typically by wire 120, but any other transmission medium including fiber, microwave or radio may be used. Base station 100 has a coverage area 115 within which its transmissions may be received. Located within coverage area 115 are repeaters 101, 102, 103 and remote subscriber units such as remote unit 110 (i.e. portable telephone). Each repeater 101, 102, 103 has a respective primary transmission path 123, 124, 126 to base station 100 while remote unit 110 has primary path 125 to base station 100. Remote unit 110 may utilize alternative transmission path 141 in order to traverse repeater 103 and access base 100. Remote units (i.e. telephones) 108, 109 have respective primary transmission paths 121, 122 to traverse repeaters 101, 102 to reach base station 100. Repeaters 101, 102, 103 are designated as level one because they communicate directly with the base station (i.e., there is one tier of repeaters being traversed to reach base 100). Similarly, the transmission coverage area for base station 100 is designated as level zero. It will be appreciated that these particular level designations are for convenience only and that other numerical or diverse designations may be used to identify the coverage area levels.

Repeaters in the system of the present invention typically receive communications transmitted from base 100 or other repeaters and re-transmit the communication to succeeding levels of repeaters or remote units until the communication reaches the desired remote unit. Transmission of a responding communication from the desired remote unit to base 100 is achieved by traversing repeaters at successive levels until base 100 receives the transmission. Repeaters may communicate with any number of repeaters on the same, previous or succeeding levels of any coverage area of the repeater.

Each repeater within coverage area 115 has its own coverage area (not shown for repeaters 101,102) where communications may be received and further transmitted. For example, repeater 103 has a coverage area 116 overlapping coverage area 115 and further includes repeaters 104 (coverage area not shown), 105 and remote units (i.e., telephones) 111, 112. Repeaters 104, 105 are designated as level two since they are the second tier of repeaters needed to reach base 100 (i.e., they can communicate with the base only via a level one repeater). Primary paths 128, 129 respectively, connect repeaters 104, 105 to repeater 103, while primary paths 127, 130 respectively connect remote units (i.e. telephones) 111, 112 to repeaters 103, 104. Remote unit 111 may utilize alternative path 143 to traverse repeaters 105 and 103 to reach base 100, while remote unit 112 may utilize alternative path 142 to directly traverse repeater 103 to reach base 100. Repeaters 104, 105 each may use alternative path 144 to traverse each other and repeater 103 to reach base 100.

Repeater 105 has a coverage area 117 that overlaps coverage area 116 and further includes repeater 106

(coverage area not shown) and remote unit 113 (i.e., laptop computer using either modem or direct digital communications). Repeater 106 is designated as level three since this is the third tier of repeaters through which a remote unit, in the coverage area of repeater 106, must communicate to access base 100. Primary paths 131, 133 respectively connect remote units 113, 114 (i.e., portable telephone) to repeaters 105, 104 while primary path 132 connects repeater 106 to repeater 105. Remote units 113, 114 may respectively utilize respective alternative paths 145, 146 to traverse repeaters 106, 105 and 103 to reach base 100.

Exemplary operation of the repeater network is now described with reference to a call to remote unit 114. The call arrives at the network via common equipment 107 and is transferred to base 100 to be transmitted within its coverage area 115. Repeaters 101, 102 and 103 receive the transmission within coverage area 115 and retransmit the call within their respective coverage areas. Since the called subscriber at remote unit 114 is not, in the example, in the coverage areas of repeaters 101 and 102, or in the coverage areas of repeaters served by repeaters 101 and 102, there is no response to the transmission by these repeaters. Repeater 103 transmits the call in its coverage area 116. Repeaters 104, 105 receive the transmission within coverage area 116 and retransmit the call within their respective coverage areas. Remote unit 114 may receive the call either via transmission path 133, from repeater 104 or via path 146 from repeater 106 retransmitting the transmission from repeater 105. Specifically, remote unit 114 is located in the overlapping portion of the coverage areas of both repeaters 104, 106 and receives transmissions from both repeaters. Remote unit 114 selects and utilizes the stronger of the two signals from repeaters 104 (path 133) and 106 (path 146). For example, if the transmission is interrupted while path 133 is being used, remote unit 114 automatically utilizes alternative available path 146. Further, repeaters 104, 105 may also utilize alternative path 144 to traverse each other and repeater 103 to reach base 100 in case of transmission interruption.

Remote unit 114 transmits responses to the call by traversing the repeater path in reverse order back to base 100 and common equipment 107. Call connections to other remote units are completed in the same manner by traversing the network as described above.

Figure 2:
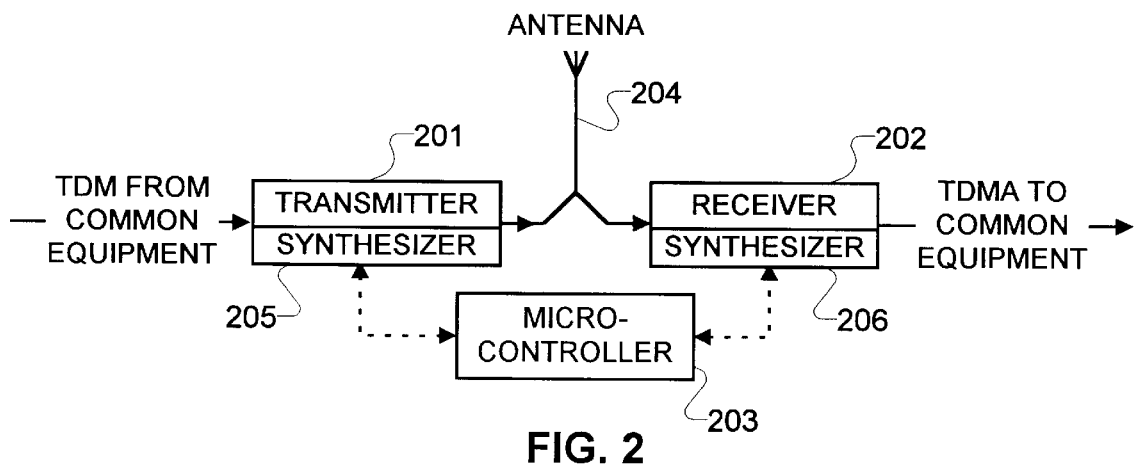
FIG. 2 is a block diagram of a base unit according to the present invention.
Figure 3:
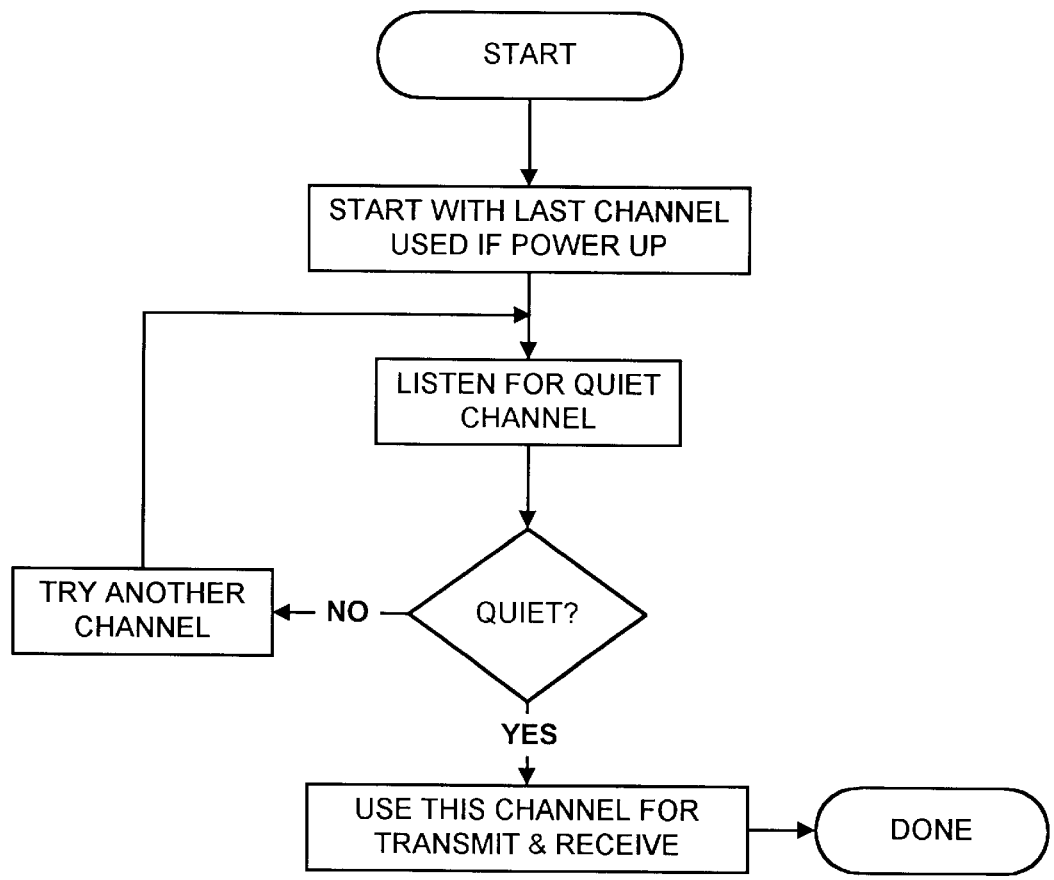
FIG. 3 is a procedural flow chart of RF channel selection by base units and repeaters according to the present invention.

Referring to FIGS. 2 and 3, base station 100 (FIG. 1) typically includes a transmitter 201 with associated synthesizer 205, receiver 202 with associated synthesizer 206, antenna 204, and microcontroller 203. Each of these components is known in the art and commercially available. Synthesizer 205 generates the carrier frequency at which transmitter 201 transmits signals while synthesizer 206 sets the receive carrier frequency for receiver 202. Microcontroller 203 controls synthesizers 205, 206 to regulate the transmission and reception frequencies based on the received signal quality, and selects an idle radio frequency (RF) channel for transmission and reception. Microcontroller 203 selects an RF channel on power-up by first selecting the channel last used prior to powering down. If the selected channel is not quiet (i.e., in use), then other channels are selected until a quiet channel is found.

Transmitter 201 and receiver 202 operate sequentially, never simultaneously, and are therefore directly coupled to antenna 204. Transmitter 201 first transmits to the network via antenna 204 an outbound TDM burst of a communication received from common equipment 107 (FIG. 1), and then receiver 202 sends via wire 120 (FIG. 1) a received inbound TDMA burst, originating from a remote unit, to common equipment 107. Base 100 utilizes time division duplex transmission (TDD) to coordinate transmission and reception. Specifically, each end of a communication link (base and remote) alternates between transmission and reception while sharing a communication path wherein each direction of the communication utilizes the same frequency. Each end of the communication link communicates in a burst of data requiring synchronization at the beginning of each burst in digital systems. Further, antenna diversity may be provided where base 100 typically includes a plurality of antennas and transmitter 201 uses the antenna, for each time slot, providing the best reception during inbound time slots.

Figure 4A:
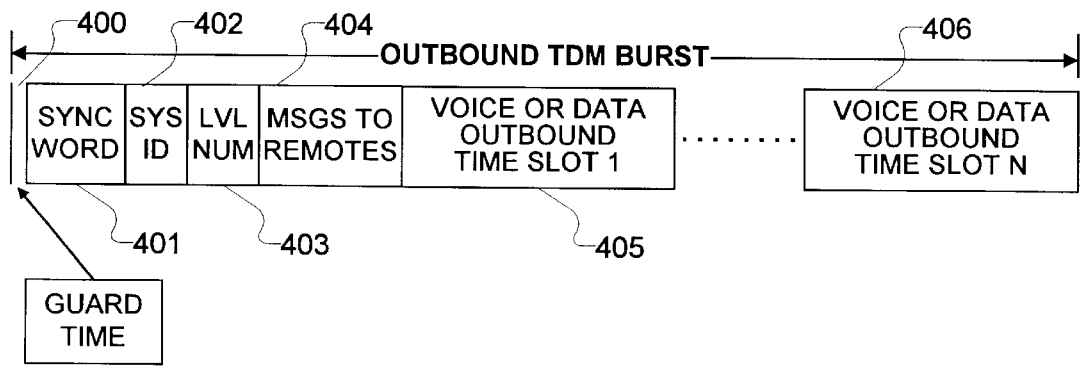
FIG. 4A is a block diagram of the time division multiplexing format of transmissions sent from the base unit.
Figure 4B:
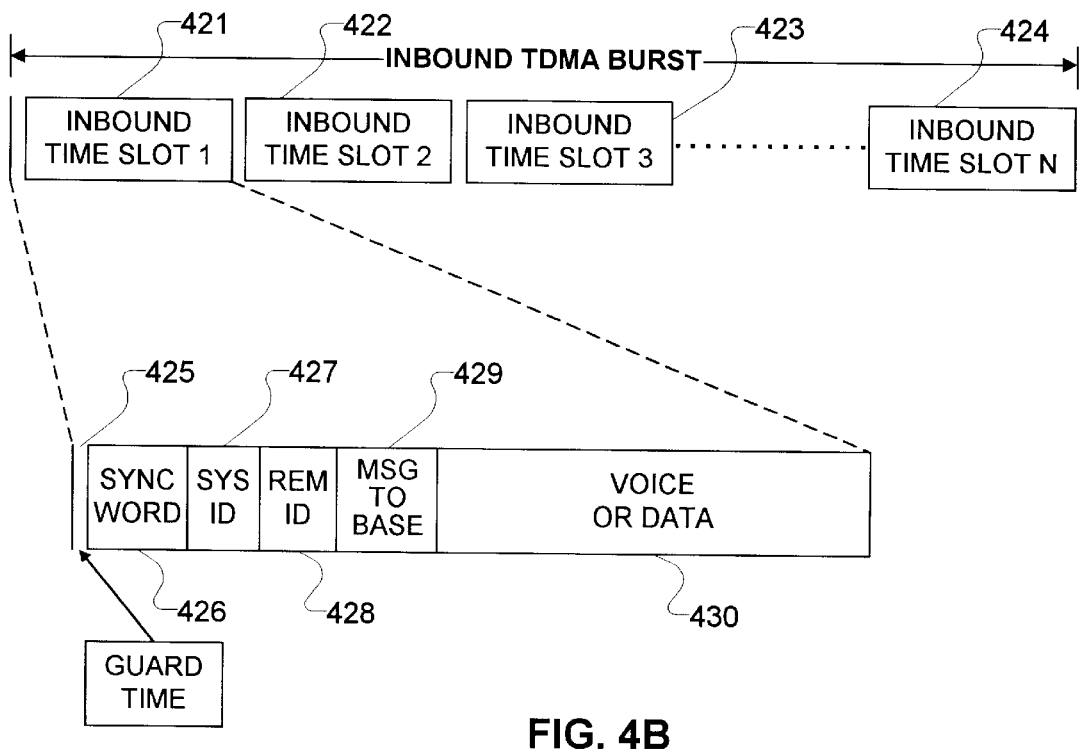
FIG. 4B is a block diagram of the time division multiple access format of transmissions sent to the base unit.

FIGS. 4a and 4b illustrate time-segmented contents of the typical outbound TDM and inbound TDMA time bursts, respectively, transmitted and received by the base, repeaters and remote units. The time bursts may be implemented using any TDM/TDMA/TDD format modifications suitable for other data or sequences. Specifically, common equipment 107 assigns calls to available time slots in a transmission burst. Conventional techniques utilize a single time slot in each direction for a single call, however more than one time slot may be used for wider bandwidth information (i.e. high speed data, digitized video, etc.), and reduced average bandwidth may be achieved by having one or more outbound time slots sent to multiple remote units while the inbound time slots are shared. The typical outbound TDM burst format is shown in FIG. 4a, and contains information transmitted from the base to the repeaters and remote units. A guard time 400 is inserted prior to the first information in the outbound TDM burst to allow for the repeaters and remote units to switch from transmission mode to reception mode. Sync word 401 is the first information in the burst format and is utilized by the repeaters and remote units to synchronize their respective receivers. Such synchronization techniques are standard and well known in the art. System ID 402 follows sync word 401 and contains system and base identification to permit the repeaters and remote units to communicate only with their associated common equipment and bases. Level number burst segment 403 represents a level number where the base corresponds to zero, and each repeater level increments the level number by one to designate the tiers of repeaters traversed (FIG. 1). Messages to remotes 404 contain control information for repeaters and remote units including: notice of incoming calls, acknowledgment of requests for service from remote units, assignment of time slots, and maintenance and administration messages. The aforementioned data words are considered overhead and are used purely for maintenance and operation of the system.

Following the overhead data, time slots 405 through 406 typically include numerous time slots transmitted in sequence and may contain digitized voice, video or other data. There may be any number of time slots, but the preferred embodiment typically utilizes from four to twelve time slots. The base station transmits all time slots regardless of whether or not they are in use.

The typical inbound TDMA burst format is shown in FIG. 4b, and typically contains information transmitted in individual time slots 421, 422, 423, 424 from the remote units through repeaters or directly to the base. Each inbound time slot 421–424 in the TDMA burst includes a guard time 425 separating the time slot from the preceding time slot to allow for propagation delay of the bursts through varying levels of repeaters. Each time slot 421–424 typically includes, following guard time 425, a sync word block 426, sys ID block 427, rem ID block 428, message to base block 429, and voice or data block 430. Sync word 426 has the same function as sync word 401 (FIG. 4a) described above. Sys ID block 427 allows repeaters to identify remote units associated with the same system as the repeater. Rem ID block 428 informs the base which remote unit is transmitting. Message to base block 429 is utilized to send information including: on/off hook requests, dialing information, feature requests, call set-up requests and other communication between the remote units and the base. Voice or data block 430 typically contains digitized voice, video, or other data being sent to the base. Since inbound TDMA bursts originate from varying remote units, each remote unit burst has its own sync word 426, Sys ID block 427, rem ID block 428, message to base block 429, and voice or data block 430. The inbound TDMA bursts typically require greater time than the outbound TDM bursts because guard time 425 is inserted between each inbound block.

Figure 5:
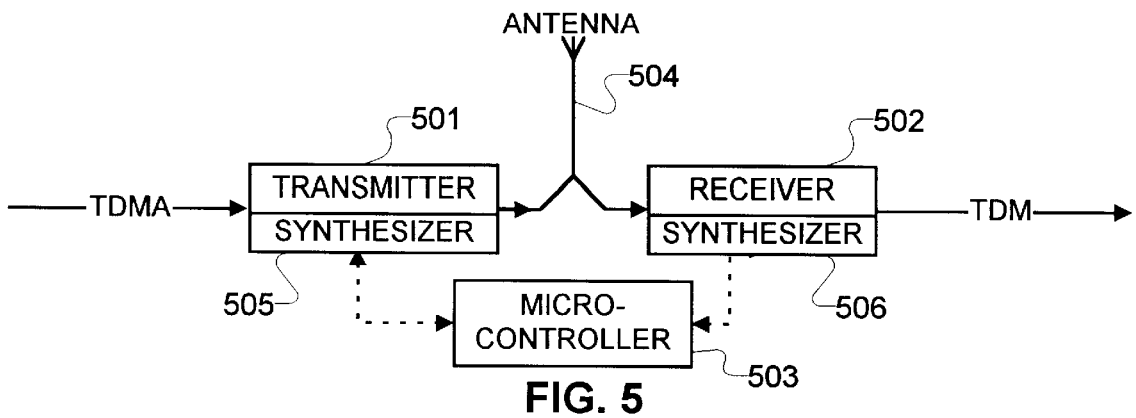
FIG. 5 is a block diagram of a remote unit according to the present invention.
Figure 6:
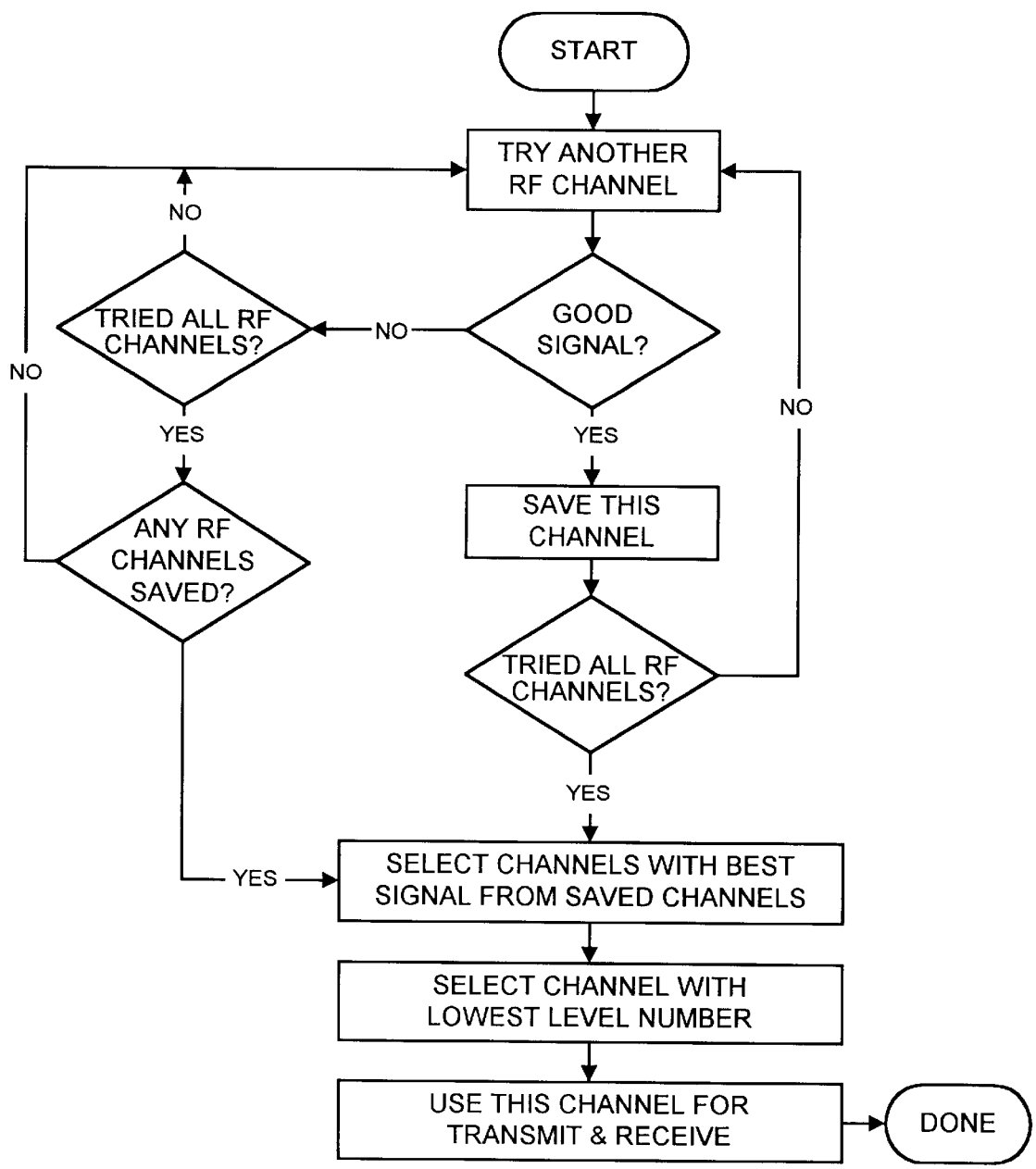
FIG. 6 is a procedural flow chart of selecting a best signal by the remote unit of FIG. 5.

Referring to FIGS. 5–6, a remote unit 108–114 (see FIG. 1) typically includes a transmitter 501 with an associated synthesizer 505, a receiver 502 with an associated synthesizer 506, a microcontroller 503, and an antenna 504. Each of these components is conventional and commercially available. Microcontroller 503 monitors received signal quality and controls synthesizers 505, 506 to set the transmission and reception frequencies.

A remote unit may be any of several different types of communication devices typically including: desktop telephones, handheld telephones, mobile phones, data terminals, video cameras, video monitors, separate radio unit with one or more phones, data terminals, or video devices connected by wire or wireless means.

On power-up, remote units scan an assigned RF band to find the best signal received from their associated base 100. The best signal is determined by monitoring received signal strength or received error rates for all possible channels from base 100 and the individual repeaters 101–105, etc. If a plurality of signals meets a threshold quality level, a signal received directly from the base is given priority and selected first. If no signals are received by the remote unit directly from the base, a signal received from a repeater closest to the base, as designated by the lowest level number, is selected. During a portion of the outbound TDM bursts (i.e., from the base and repeaters), the remote units constantly seek alternative paths to the base. If another RF channel has a stronger signal emanating from the associated base 100, and if the current channel is marginal or worse, the remote unit autonomously switches to the stronger signal without cooperation from the base or common equipment. The new signal may be received from the base or a repeater and contains substantially the same outbound TDM burst time slots in substantially the same sequence. If the currently received signal is adequate, the remote unit keeps track of the other RF channels so as to have an alternative path ready in case of signal deterioration. If path switching occurs during a call, the call resides in the same time slot on the new signal. Such call switching occurs during the guard time between bursts (FIG. 4A, 4B) so as not to disturb ongoing calls. TDD allows for path selection to be based solely on received signal quality since the transmitted signal utilizes the same frequency as the received signal and it may be assumed that one transmission direction yields results substantially equivalent to those in the other direction.

Remote units typically monitor outbound TDM bursts for incoming calls, administrative messages, and idle time slots selected by the remote unit or assigned by the common equipment to originate a call, Remote units receive transmissions only during their assigned outbound TDM time slot, and transmit only during their assigned inbound TDMA time slot. The remote units transmit only during the set-up or talking portions of a call for a particular time slot where the use of that time slot by a remote unit endures for the duration of the call. Additional time slots may be utilized for additional bandwidths (i.e. digitized video, high speed data applications, etc.). Such multiple time slot usage is transparent to the base and repeaters. Administrative information between the base and remote unit may be passed utilizing a standard voice slot (when available), special time slot, as part of the slot used for digitized voice, or in some combination of these. Outbound supervision and signaling may be performed using the same outbound TDM time slot as in voice, or the supervision and signaling may be grouped with similar control information of other channels. Inbound supervision for call set-up and take down may be performed using the same inbound TDMA time slot as digitized voice. Such communication of supervision signaling and control is well known in the art.

Figure 7:
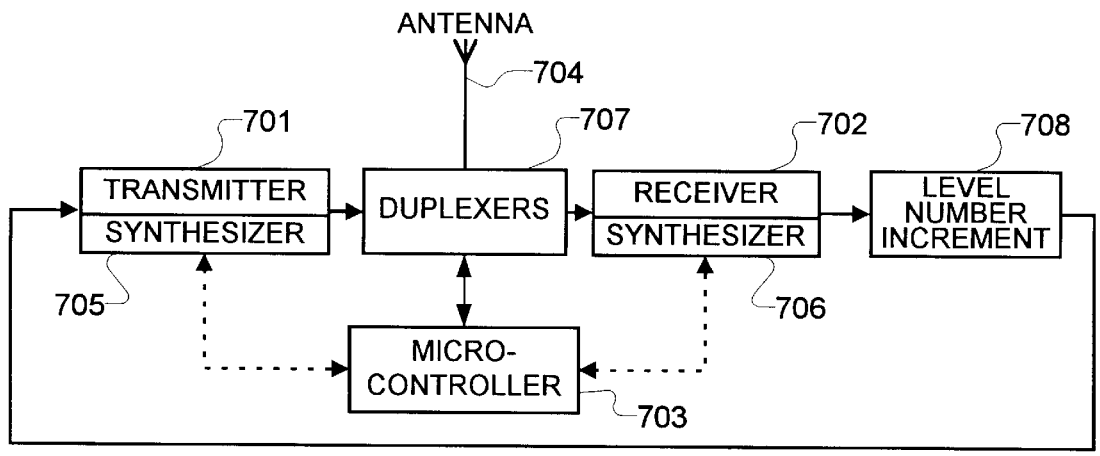
FIG. 7 is a block diagram of a repeater according to the present invention.
Figure 8:
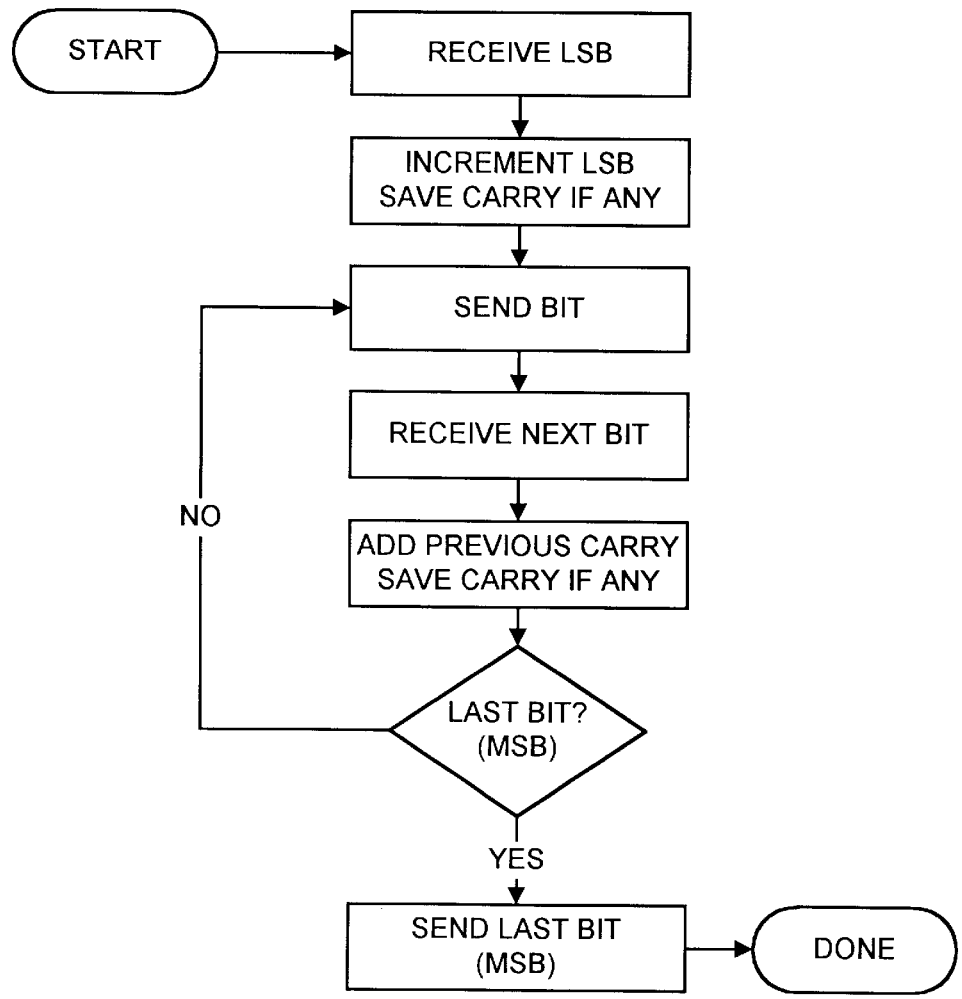
FIG. 8 is a procedural flow chart of incrementing the level number within the format of FIG. 4A by the repeater of FIG. 7.

Referring to FIGS. 7–8, a repeater 101–106 typically includes a transmitter 701 with an associated synthesizer 705, duplexers 707, a microcontroller 703, a receiver 702 with an associated synthesizer 706, a level incrementer 708, and an antenna 704. Each of the components 702 through 707 is conventional and commercially available. Level incrementer 708 may be implemented in software (in microcontroller 703) or hardware (i.e., an adder circuit). Repeaters are configured so that transmitter 701 and receiver 702 operate simultaneously. Microcontroller 703 monitors signal quality and controls synthesizers 705, 706 to set the transmission and reception frequencies. Microcontroller 703 further controls duplexers 707 to isolate receiver input signals from transmitter output signals, thereby permitting simultaneous operation of transmitter 701 and receiver 702.

Transmit and receive frequencies are each determined and set to be at opposite halves of a band (e.g., lower, upper), in order to enable microcontroller 703 to control duplexer 707 to pass the appropriate receiver portion of the band to receiver 702 while blocking the transmission portion. In the preferred embodiment, two duplexers are utilized, each tuned to pass a different half of a band, and each controlled by microcontroller 703 to be connected at the outbound and inbound portions of the TDD cycle so that the proper duplexer is connected for passing the appropriate band portions during reception or transmission.

During an outbound TDM burst from the base or repeaters, receiver 702 is tuned by microcontroller 703 (controlling synthesizer 706) to receive signals at a specified reception frequency. Receiver 702 delivers the bits received to transmitter 701 through level number incrementer 708 where the received level number 403 (FIG. 4a) of the outbound TDM burst (FIG. 4A) is incremented by one. In other words, a level two repeater 104 receives TDM bursts in which the level number in time slot 403 is one, and its level number incrementer 708 increases that number to two in the time slot 403 transmitted from repeater 104. Transmitter 701 then transmits the received bits with a transmission frequency set by microcontroller 703 to be different from the reception frequency. After transmission of the outbound TDM burst, microcontroller 703 instructs synthesizers 705, 706 to swap frequencies so that receiver 702 is tuned to the transmission frequency while transmitter 701 is tuned to the reception frequency. Receiver 702 then receives any inbound TDMA time slot bursts from remote units or repeaters in its coverage area and this information is sent to transmitter 701 to be transmitted. The effect of the exchange of reception and transmission frequencies is that all outbound TDM and inbound TDMA bursts sent between two units (base, repeater or remote unit) are on substantially the same carrier frequency as described below with respect to FIG. 9. Incrementer 708 has no effect on inbound TDMA bursts.

Repeaters 101–106 typically select an outbound RF channel in a manner substantially similar to the process utilized in base units as described above in relation to FIG. 3. Further, repeaters 101–106 select the strongest RF channel transmission in a manner substantially similar to the procedure utilized by remote units as described above in relation to FIG. 6. Repeaters do not transmit any inbound TDMA bursts originating from a remote unit not associated with the base of the repeater as determined from the system ID block 427 (FIG. 4B). Repeaters may be built into user remote units so that any user location may also serve as a repeater site; this feature may be remotely enabled.

Figure 9:
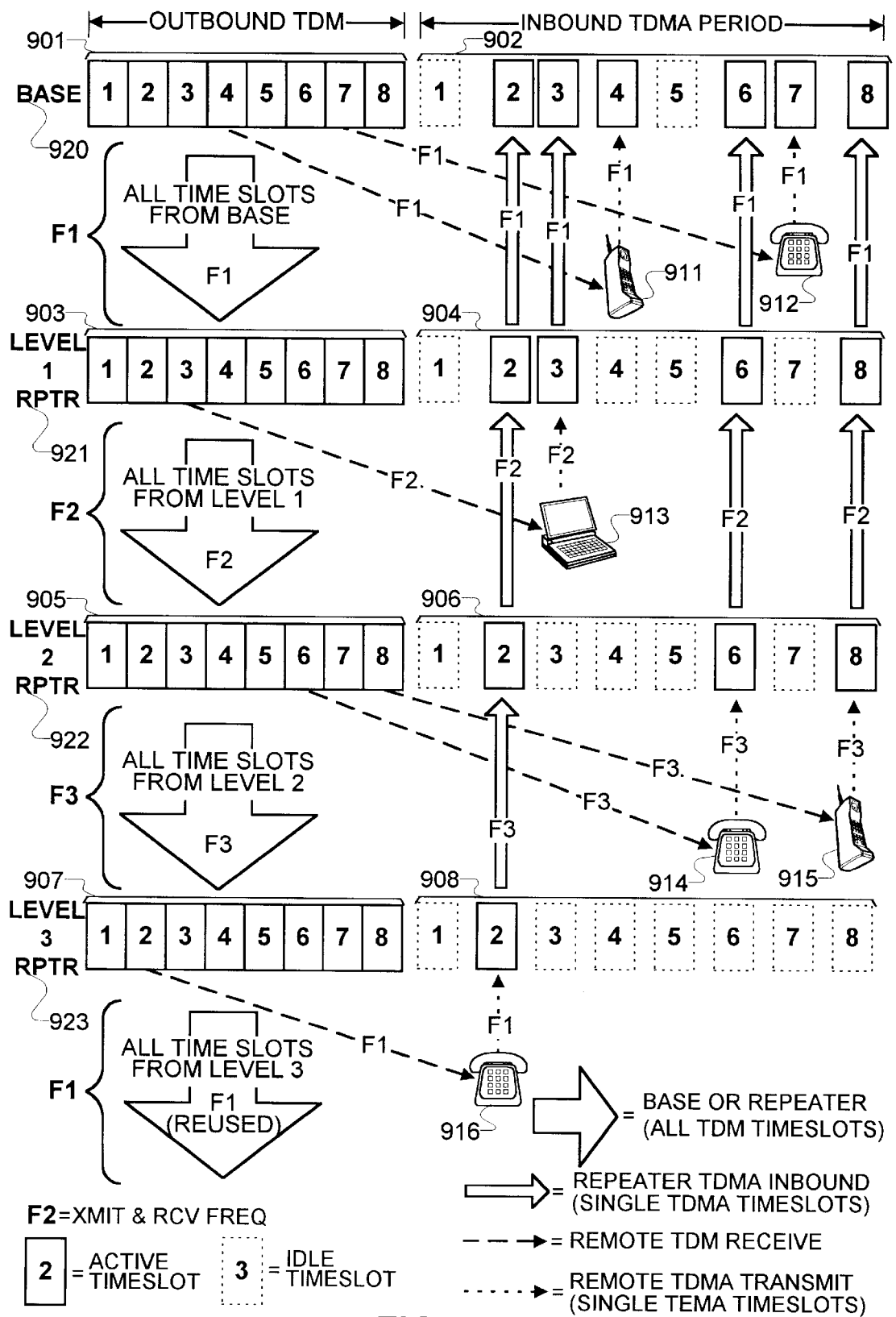
FIG. 9 is a topological view of the hierarchical repeater network utilizing the frequencies and time slots of the formats of FIGS. 4A, 4B according to the present invention.

FIG. 9 illustrates an exemplar use of time slots and frequencies according to the present invention. Specifically, an outbound TDM burst and an inbound TDMA burst are represented as containing eight time slots each. Base transmission 920 includes all eight time slots 901 at frequency f1. Remote unit 911 receives time slot 4 of base transmission 920 and transmits an inbound TDMA response to the base unit at frequency f1 in time slot 4 of inbound time slots 902. Similarly, remote unit 912 receives time slot 7 of base transmission 920 and responds at frequency f1 utilizing time slot 7 of the inbound time slots 902. Level one repeaters receive base transmission 920, containing time slots 901, on frequency f1 in corresponding time slots 903 and retransmits them at a frequency f2. The different reception and transmission frequencies are used by duplexers in the repeaters to mutually isolate reception and transmission as described above. Remote unit 913 receives time slot 3 of the transmission 921 from the level one repeater and transmits at frequency f2 a response to level one repeater in time slot 3 of inbound time slots 904 for that repeater. Level one repeaters receive inbound time slots 904 from a succeeding level repeater and remote units in their coverage areas, such as remote unit 913, on frequency f2 and retransmit the inbound time slots 904 to the base unit using frequency f1.

Similarly, level two repeaters receive level one transmission 921, including time slots 903, at frequency f2 and transmit corresponding time slots 905 as transmission 922 on frequency f3. Further, level two repeaters receive time slots 906 from a succeeding or higher level repeater and remote units 914, 915 on frequency f3. Remote units 914, 915 respond in the same time slot in the inbound TDMA period as the time slot received in the outbound TDM period. Level two repeaters transmit inbound time slots 906 to level one repeaters at frequency f2 where time slots 906 are ultimately transmitted to the base on frequency f1 as time slots 902.

Likewise, level three repeaters receive transmission 922, including time slots 905 from level two repeaters, as outbound time slots 907 on frequency f3 and transmit those time slots within the level three coverage area as transmission 923 containing time slots 908 at, for example, frequency f1 which is substantially the same frequency used for transmission 920 by the base. Frequency f1 may be reused since level three repeaters may be located far enough away from the base unit such that there is no overlap of transmission coverage areas between transmissions 920 and 923. Level three repeaters receive time slots 908 from a succeeding level repeater and remote unit 916 on frequency f1. Remote unit 916 responds in the same time slot in the inbound TDMA period as the time slot it received in the outbound TDM period. Level three repeaters transmit inbound time slots 908 to level two repeaters on frequency f3 where time slots 908 are then transmitted to level one repeaters on frequency f2 and ultimately transmitted to the base unit on frequency f1 as time slots 902.

The foregoing illustrative description serves merely as an example of the operation of the present invention, and any number of time slots, remote units, frequencies (and reuse of frequencies), and levels of repeaters may be implemented in the manner described.

Figure 10:
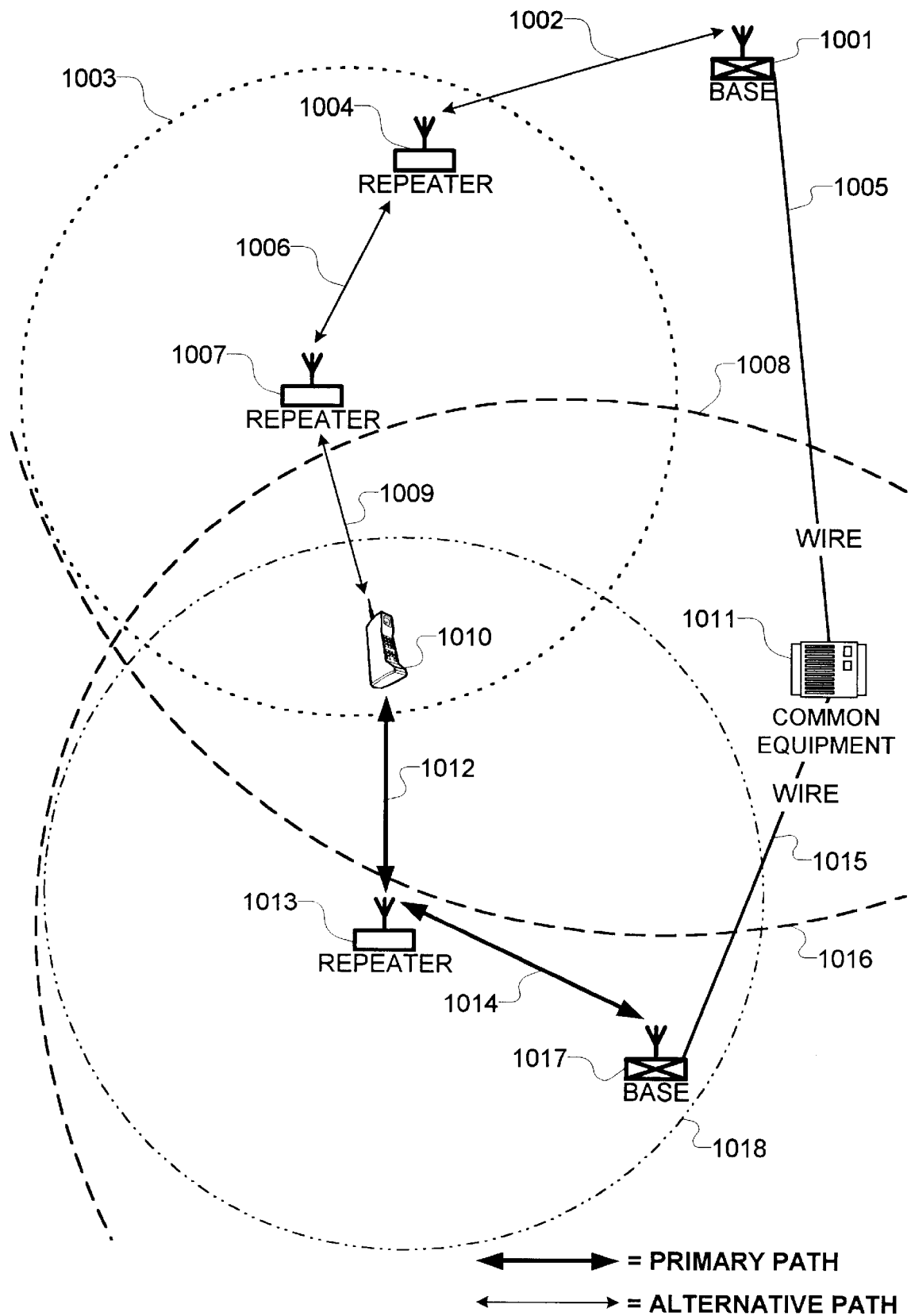
FIG. 10 is a topological view of the hierarchical repeater network in a multi-base configuration according to the present invention.

Repeaters typically communicate with only a single base; however multiple bases and associated repeaters may overlap and interchange calls while servicing the same common equipment as shown by example in FIG. 10. This enables remote units to roam and switch between different bases servicing the same common equipment. Specifically, common equipment 1011 is connected by wires 1005, 1015 (or other transmission media described above) to respective bases 1001, 1017. Base 1001 has associated repeaters 1004, 1007 with the coverage area 1003 for repeater 1007 encompassing the location of remote unit 1010 (i.e., portable telephone). Base 1017 has an associated repeater 1013 with a coverage area 1018 also encompassing the location of remote unit 1010. Each base and its associated repeater network form a "macrocell". The present example illustrates two overlapping macrocells with coverage areas 1008 (base 1001 ), 1016 (base 1017). The preferred transmission path of remote unit 1010 is through repeater 1013 (via primary path 1012) to base 1017 (via primary path 1014) to common equipment 1011. If remote unit 1010 (i.e. portable telephone) realizes a stronger signal from repeater 1007 of a neighboring macrocell, the remote unit requests (or automatically arranges) its call to be broadcast by the neighboring macrocell. The remote unit and common equipment 1011 may arrange for the call to appear in a known time slot; that is, common equipment 1011 may place the call in an available time slot and advise the remote or the remote may perform a search to determine the time slot. Once remote unit 1010 begins utilizing the neighboring macrocell, common equipment 1011 removes the call from the previous macrocell. The path via the new macrocell is through repeater 1007 (via alternative path 1009) to repeater 1004 (via alternative path 1006) to base 1001 (via alternative path 1002) to common equipment 1011 (via wire 1005 or other means). This procedure may be implemented utilizing any number of base stations, all connected to the same common equipment 1011.

Common equipment 1011 uses each base 1001, 1017 as a pool of time slots which can be assigned as needed to reach remote units within the coverage area of that base. If the system does not need additional time slots, all bases may carry the same call in the same time slots as other bases, thereby forming a large area handling fewer calls. Switching between macrocells (hand-offs) is then controlled by remote units and operation is the same as described above in relation to FIG. 1 whether transmitting between or within macrocells.

It will be appreciated that the embodiments described above and illustrated in the drawings represent only a few of the many ways of implementing hierarchical wireless repeaters with autonomous handoff.

The present invention may be implemented using any number of bases, repeaters, and remote units forming any number of level configurations to blanket a specified area. Further, multiple systems may be interconnected to increase coverage area. The system is capable of handling high speed data, digitized video or any other similar information capable of being sent on a communication system, in combination or separate from voice telephone uses. Further, any number of time slots may be employed to accommodate the influx of calls or communications. The outbound TDM and inbound TDMA formats may be implemented in various sequences and contain varying information as needed for different network configurations.

The transmitters and synthesizers of the components of the present invention may be implemented by any means capable of transmitting a specified frequency. The receivers and synthesizers may be implemented by any means capable of receiving a specified frequency. The microcontrollers may be implemented by any commercially available controllers, microprocessors, combinatorial logic, or other circuitry capable of monitoring signal quality. The antennas may be implemented by any means capable of radiating and receiving signals.

The remote units of the present invention may be telephones (fixed, mobile), computers, or any other device capable of wired or wireless communication.

The duplexers of the present invention may be implemented by any means capable of separating information in a frequency band.

The system may be implemented by providing increased central control of frequency and time slot selection, if desired, at the sacrifice of autonomy. In addition, the outgoing and incoming time slots at any level need not be the same, as long as there is some control over identifying information transmitted/received in any time slot. The time durations and numbers of bits may be varied from time slot to time slot and for similar information transmitted at different levels.

From the foregoing description it will be appreciated that the invention makes available a novel method and apparatus for wireless digital communication system having hierarchical wireless repeaters with autonomous handoff wherein a base communicates to a remote unit or intermediate repeaters (transmitters) where the remote unit and repeaters may autonomously switch paths to the base depending on received signal strength.

Having described preferred embodiments of the new and improved method and apparatus for hierarchical wireless repeaters with autonomous handoff, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A wireless communication system in which a system base station in communication with an external communications network transmits an outgoing signal to multiple remote system subscriber units as time division multiplex (TDM) bursts of multiple sequential time slots containing outgoing call information, and receives an incoming signal from the multiple remote units as time division multiple access (TDMA) bursts of multiple sequential time slots containing incoming call information, wherein said outgoing signal bursts and said incoming signal bursts alternate in time, and wherein each call between a remote unit and the base station has its information contained in a respective time slot, said system comprising:

a plurality of repeaters for receiving and retransmitting signals, said repeaters being positionally spaced from one another and from said base station and having, along with said base station, a respective plurality of transmission coverage areas in which signal transmissions from respective repeaters and from the base station can be received by remote units and/or other repeaters, wherein each transmission coverage area and its repeater have a level designation corresponding to the number of repeaters through which signals from the base station must be retransmitted to reach said each repeater, and wherein each repeater relays said outgoing signal to and from other repeaters and remote units located in the transmission coverage area of said each repeater;

wherein said base station includes means for transmitting said outgoing signal and receiving said incoming signal at a first carrier frequency;

wherein the repeaters in the transmission coverage area of said base station have a first of said level designations and include: means for receiving said outgoing signal from said base station at said first carrier frequency and retransmitting said outgoing signal at a second carrier frequency different from said first carrier frequency; and means for receiving said incoming signal at said second carrier frequency and retransmitting said incoming signal to said base station at said first carrier frequency, wherein said second carrier frequency at different first level repeaters may be the same or different depending upon whether or not the transmission coverage areas for those first level repeaters overlap; and wherein each of said remote units includes: means for automatically selecting the carrier frequency of the strongest of the outgoing signals received from the base station and repeaters; and means for communicating at said selected carrier frequency, via the appropriate time slots in said outgoing and incoming signals, with the repeater or base station transmitting said strongest outgoing signal.

2. The system of claim 1 wherein repeaters located in the transmission coverage area of a first level repeater have a second of said level designations and include: means for receiving said outgoing signal from one of said first level repeaters at the second carrier frequency of that first level repeater and retransmitting said outgoing signal at a third carrier frequency different from that second carrier frequency; and means for receiving incoming signals at said third carrier frequency and retransmitting said incoming signals to said one, of said first level repeaters at the second carrier frequency of said one of said first level repeaters;

wherein the third carrier frequency at different second level repeaters may be the same or different depending upon whether the transmission coverage areas for those second level repeaters overlap.

3. The system of claim 2 wherein each of said repeaters include a common transmitter for alternately transmitting said outgoing signal and at least portions of said incoming signal.

4. The system of claim 1 wherein repeaters at any level j, where j is greater than one, receive said outgoing signals from and transmit said incoming signals to a repeater at level (j−1) at a common carrier frequency, wherein said common carrier frequency may be the same or different at different repeaters depending upon whether or not the transmission coverage areas for those repeaters overlap.

5. The system of claim 4 wherein each repeater includes means responsive to call information in a time slot of the outgoing signal directed thereto for transmitting call information back toward the base station in a time slot of the incoming signal sequentially corresponding to the time slot of the outgoing signal containing the call information.

6. The apparatus of claim 5 wherein each of said repeaters includes means for receiving said outgoing signal at a carrier frequency in a portion of a prescribed frequency band and for retransmitting said outgoing signal at a carrier frequency in another portion of said prescribed frequency band.

7. The system of claim 5 wherein each of said repeaters include a common transmitter for alternately transmitting said outgoing signal and at least portions of said incoming signal.

8. A method for expanding wireless communication beyond the transmission coverage area of a base station serving to connect multiple remote subscriber units to a communication network, wherein said base station transmits an outgoing signal to the remote subscriber units in TDM bursts having multiple time slots each containing data for a respective call between a respective remote subscriber unit and said network, and wherein the base station receives an incoming signal from said remote subscriber units in TDMA bursts having multiple time slots each containing data for said respective call, said method comprising the steps of:

(a) transmitting said TDM bursts from said base station and transmitting said TDMA bursts from said remote subscriber units at different alternating times;

(b) expanding the transmission coverage area of the base station via at least a first repeater located in the transmission coverage area of said base station, said first repeater having a transmission coverage area extending beyond the base station transmission coverage area;

(c) transmitting said TDM bursts as a base station outgoing signal at a first carrier frequency throughout the base station transmission coverage area;

(d) in response to receiving said base station outgoing signal at said first repeater, transmitting said TDM bursts as a first repeater outgoing signal at a second carrier frequency throughout the first repeater transmission coverage area;

(e) in response to a current call between said network and an active remote subscriber unit located in the first repeater transmission coverage area, receiving said first repeater outgoing signal at said active remote subscriber unit and processing a time slot of said TDM burst assigned to said current call;

(f) transmitting to said first repeater from said active remote subscriber unit information in a time slot of said TDMA burst assigned to the current call at said second frequency as part of a first repeater incoming signal; and (g) retransmitting from said first repeater to said base station at said first carrier frequency, as part of a first repeater incoming signal, the time slot of said TDMA burst transmitted by said active remote subscriber unit.

9. The method of claim 8 further comprising the steps of:

(h) expanding the transmission coverage areas of the first repeater and base station via a second repeater located in the first repeater transmission coverage area but outside the base station transmission coverage area, said second repeater having a transmission coverage area extending beyond the first repeater transmission coverage area;

(i) in response to receiving said first repeater outgoing signal at said second repeater, transmitting said TDM bursts as a second repeater outgoing signal at a third frequency throughout the second repeater transmission coverage area;

(j) in response to a further current call between said network and a further active remote subscriber unit located in the second repeater transmission coverage area, receiving said second repeater outgoing signal at said further active remote subscriber unit and processing a time slot of said TDM burst assigned to said further current call;

(k) transmitting to said second repeater from said further active remote subscriber unit information in a time slot of said TDMA burst assigned to the further current call at said third frequency as part of a second repeater incoming signal;

(l) retransmitting from said second repeater to said first repeater at said second carrier frequency, as part of a second repeater incoming signal, the time slot of said TDMA burst transmitted by said further active remote subscriber unit; and (m) retransmitting from said first repeater to said base station at said first carrier frequency, as part of said first repeater incoming signal, the time slot of said TDMA burst transmitted by said further active remote subscriber unit.

10. In a wireless communication system configured in hierarchical levels of repeaters, a method for transferring information comprising the steps of:

(a) interfacing a base station to a switching network to relay inbound and outbound communications;

(b) transmitting said outbound communications of said switching network in the form of outbound signals from said base station to said hierarchical levels of repeaters successively and transmitting said inbound communications successively through said hierarchical levels of repeaters and said base station in the form of inbound signals to relay said inbound communications to said switching network, wherein said inbound signals include multiple sequential inbound time slots containing incoming information from a final destination and said outbound signals include multiple sequential outbound time slots containing outgoing information from said switching network; and (c) at each hierarchical level of repeaters:

(c.1) receiving said outbound signals at a first frequency of particular band and retransmitting said outbound signals at a second different frequency of said particular band; and (c.2) receiving said inbound signals at said second frequency and retransmitting said inbound signals at said first frequency;

wherein said outbound communications traverse said base station and each hierarchical level of repeaters until reaching said final destination, and said inbound communications originate at said final destination and traverse said hierarchical levels of repeaters in reverse order and said base station until reaching said switching network.

11. The method of claim 10 wherein step (c.1) further comprises determining said second frequency based on frequencies not in use.

12. The method of claim 10 wherein step (c.1) further comprises determining from which level to receive said outbound signals based upon received signal strength.

13. The method of claim 10 wherein step (c.1) further comprises setting said first and second frequencies at opposite halves of said particular band.

14. The method of claim 10 wherein steps (c.1) and (c.2) comprise reusing said first and second frequencies at repeaters having non-overlapping transmission coverage areas.

15. In a wireless communication system, a repeater for retransmitting communications comprising:

- an antenna for receiving and radiating inbound and outbound communications, wherein said inbound communications include multiple sequential inbound time slots containing incoming information from a communication destination and said outbound communications include multiple sequential outbound time slots containing outgoing information from a communication source;
- a receiver for receiving said inbound and outbound communications at reception frequencies;
- a receiver synthesizer for setting said reception frequencies;
- a transmitter for transmitting said received inbound and outbound communications at transmission frequencies;
- a transmitter synthesizer for setting said transmission frequencies;
- at least one duplexer for passing signals to said receiver and controlling access to said antenna between said transmitter and said receiver by controlling simultaneous operation of said transmitter and receiver; and
- a microcontroller for monitoring received signal quality of said inbound and outbound communications and controlling said transmitter and receiver synthesizers to set said transmission and reception frequencies at different parts of a particular frequency band, said microcontroller further including means for controlling said at least one duplexer to pass appropriate portions of a received band to said receiver and controlling access to said antenna by said transmitter and receiver.

16. In a wireless communication system wherein a system base station in communication with a communications network transmits an outgoing signal to multiple remote system subscriber units as time division multiplex (TDM) bursts of multiple sequential time slots containing outgoing call information and receives an incoming signal from the multiple remote units as time division multiple access (TDMA) bursts of multiple sequential time slots containing incoming call information, a method comprising the steps of:

(a) transmitting said outgoing signal bursts and said incoming signal bursts in time alternation;

(b) storing information for each call between a remote unit and the base station in a respective time slot;

(c) receiving and retransmitting said outgoing and incoming signals via a plurality of repeaters positionally spaced from one another and from said base station having, along with said base station, a plurality of respective transmission coverage areas in which signal transmissions from respective repeaters and from the base station can be received by remote units and/or other repeaters, wherein each transmission coverage area and its repeater have a level designation corresponding to the number of repeaters through which signals from the base station must be transmitted to reach said each repeater, wherein the repeaters in the transmission coverage area of said base station have a first of said level designations, and wherein each repeater relays said outgoing signals to and from other repeaters and remote units located in the transmission coverage area of said each repeater;

(d) at said base station, transmitting said outgoing signal and receiving said incoming signal at a first carrier frequency;

(e) at each first level repeater, receiving said outgoing signal from said base station at said first carrier frequency and retransmitting said outgoing signal at a second carrier frequency different from said first carrier frequency, and receiving said incoming signals at said second carrier frequency and retransmitting said incoming signals to said base station at said first carrier frequency, wherein said second carrier frequency at different first level repeaters may be the same or different depending upon whether or not the transmission coverage areas for those first level repeaters overlap; and (f) at each of said remote units, automatically selecting the carrier frequency of the strongest of the outgoing signals received from the base station and repeaters, and communicating at said selected carrier frequency and via the appropriate time slots in said outgoing and incoming signals with the repeater or base station transmitting said strongest outgoing signal.

17. The method of claim 16 further comprising the steps of:

(g) receiving and retransmitting said incoming and outgoing signals via second level repeaters positionally spaced in the transmission coverage area of said first level repeaters; and (h) at said second level repeaters, receiving said outgoing signal from one of said first level repeaters at the second carrier frequency of that first level repeater and retransmitting said outgoing signal at a third carrier frequency different from that carrier frequency, and receiving incoming signals at said third carrier frequency and retransmitting said incoming signals to said one of said first level repeaters at the second carrier frequency of said one of said first level repeaters.

18. The method of claim 17 further comprising the step of, at each repeater, alternate 14 transmitting via a common transmitter said outgoing signal and at least portions of said incoming signal.

19. The method of claim 16 wherein repeaters at any level j, where j is greater than one, receive said outgoing signals from and transmit said incoming signals to a repeater at level (j−1) using a common carrier frequency, wherein said common carrier frequency may be the same or different at different repeaters depending upon whether or not the transmission coverage areas for those repeaters overlap.

20. The method of claim 19 futher comprising the step of, at each repeater, incrementing a level count in the retransmitted outgoing signal to identify the level designation of each repeater.

21. The method of claim 20 wherein step (g) further includes:

(g.1) selecting the carrier frequency of the strongest of the outgoing signals by selecting the carrier frequency of the outgoing signal received from the base station or repeater having the lowest level count.

22. A wireless communication system configured in hierarchical levels of repeaters for interfacing a switching network to transfer information comprising:

- a base station for interfacing said switching network to relay inbound and outbound communications; and
- a plurality of repeaters arranged in hierarchical levels wherein said base station transmits said outbound communications from said switching network in the form of outbound signals to said hierarchical levels of repeaters successively and said hierarchical levels of repeaters transmit said inbound communications in the form of inbound signals successively to said base station to relay said inbound communications to said switching network, wherein said inbound signals include multiple sequential inbound time slots containing incoming information from a final destination and said outbound signals include multiple sequential outbound time slots containing outgoing information from said switching network;

wherein each repeater within a hierarchical level includes: means for receiving said outbound signals at a first frequency of a particular band and retransmitting said outbound signals at a different frequency of said particular band; and means for receiving said inbound signals at said second frequency and retransmitting said inbound signals at said first frequency;

wherein said outbound communications traverse each hierarchical level of repeaters and said base station until reaching said final destination, and said inbound communications originate at said final destination and traverse said hierarchical levels of repeaters in reverse order and said base station until reaching said switching network.

23. The system of claim 22 wherein each repeater further includes a controller to determine said second frequency based on frequencies not in use.

24. The system of claim 22 wherein each repeater futher includes a controller to determine from which level to receive said outbound signals based upon received signal strength.

25. The system of claim 22 wherein each repeater further includes a controller to set said first and second frequencies at opposite halves of said particular band.

26. The system of claim 22 wherein each repeater futher includes means for reusing said first and second frequencies at repeaters having non-overlapping transmission coverage areas.

* * * * *